United States Patent [19]
Borom

[11] 3,757,586
[45] Sept. 11, 1973

[54] PNEUMATIC ANALOGUE DECOMPRESSION INSTRUMENT

[75] Inventor: Marcus P. Borom, Schenectady, N.Y.

[73] Assignee: General Electric Company, Schenectady, N.Y.

[22] Filed: Sept. 16, 1971

[21] Appl. No.: 181,048

[52] U.S. Cl. ............................. 73/432 R, 235/184
[51] Int. Cl. ............................................. G06g 5/00
[58] Field of Search ................. 73/432 R, 299, 300, 73/1 R; 235/184

[56] References Cited
UNITED STATES PATENTS
3,121,333  2/1964  Alinari ................................. 73/299
3,209,579  10/1965  Roberts ................................ 73/1 R
3,463,015  8/1969  Gulino et al. ...................... 73/432 R FOREIGN PATENTS OR APPLICATIONS
735,170  5/1966  Canada ............................... 73/432

Primary Examiner—S. Clement Swisher
Attorney—John F. Ahern et al.

[57] ABSTRACT

A pneumatic analogue computer for use in calculating and indicating decompression schedules is disclosed. It utilizes a semipermeable membrane through which a gas diffuses in simulation of the uptake and release of nitrogen by a diver's body tissue during the hyperbaric exposures of underwater excursions.

8 Claims, 3 Drawing Figures

Patented Sept. 11, 1973 3,757,586
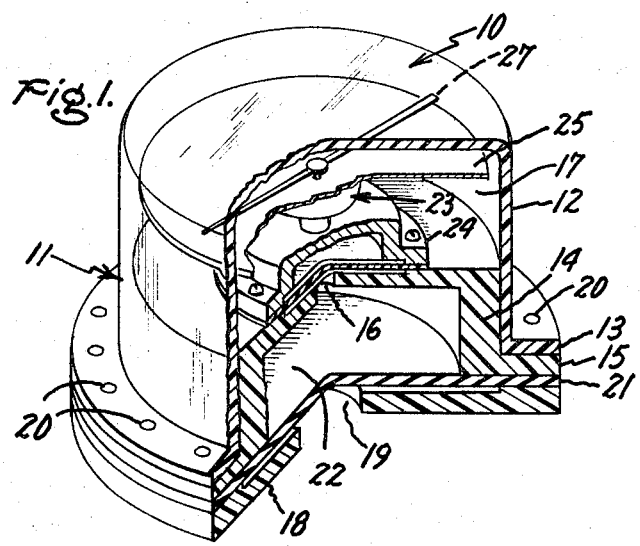
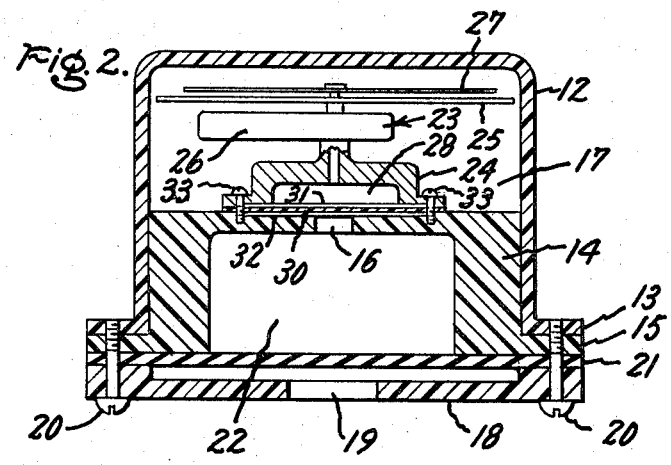
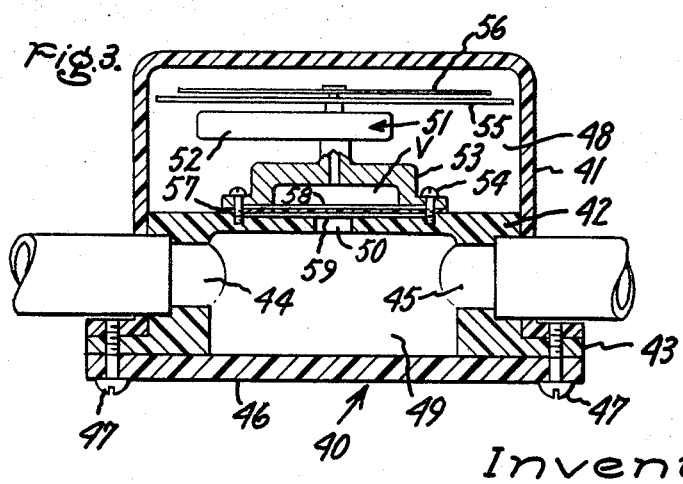
Inventor:
Marcus P. Borom,
by [signature]
His Attorney.

PNEUMATIC ANALOGUE DECOMPRESSION INSTRUMENT

The present invention relates generally to the art of computing decompression schedules and is more particularly concerned with a novel pneumatic analogue decompression instrument which continuously senses ambient pressures experienced during hyperbaric exposure and computes and indicates a minimum-duration safe decompression schedule.

CROSS REFERENCES

This invention is related to those of the following four patent applications assigned to the assignee hereof and filed of even date herewith:

Patent Application Ser. No. 181,107, filed Sept. 16, 1971 (Docket RD-4064), entitled, "Multi-Time Constant Pneumatic Analogue Decompression Instruments," in the names of Lyman A. Johnson and Marcus P. Borom, which discloses and claims the concept of matching different time-constants of various body tissues with membrane chambers of different diffusion controlled time-constant characteristics to provide a versatile decompression meter.

Patent Application Ser. No. 181,106, filed Sept. 16, 1971 (Docket RD-4053), entitled, "Miniaturized Automatic Decompression Meters," in the names of Marcus P. Borom and Lyman A. Johnson, which discloses and claims the combination of a time-constant gas chamber and a liquid-filled gauge which enables miniaturization without impairing performance of the instrument.

Patent Application Ser. No. 181,099, filed Sept. 16, 1971 (Docket RD-4206), entitled, "Single Gauge Multi-Time Constant and Multi-Tissue Ratio Automatic Decompression Instruments," in the names of Marcus P. Borom and Lyman A. Johnson, which discloses and claims the concept of connecting several different time-constant membrane assemblies in an automatic switching relation with a single gauge so that the gauge always indicates the highest pressure prevailing anywhere in the system.

Patent Application Ser. No. 181,096, filed Sept. 16, 1971 (Docket RD-4841), entitled, "Combined Depth Gauge and Pneumatic Analogue Decompression Instrument," in the names of Marcus P. Borom and Lyman A. Johnson, which discloses and claims the concept of using a porous body both to provide the volume of the time-constant gas chamber and to provide support for the semipermeable membrane and the gauge-sealing diaphragm. An additional feature is the coordinated depth gauge formed in the transparent cover of the instrument for read-out on the dial serving the decompression meter.

BACKGROUND OF THE INVENTION

The major hazard faced by both commercial and sport divers is decompression sickness which results from the release of dissolved gases from the body tissues as discrete bubbles when the ambient pressure is reduced too rapidly. As the ambient pressure is increased during a dive, the body tissues begin to absorb more gas from the breathing mixture to equilibrate with this pressure change. The rate of such equilibration varies from tissue to tissue, but not significantly from person to person, nor between compression and decompression phases, and is vitally important only in the course of return from hyperbaric exposure. Also, the tissues can withstand, to varying degrees, an internal over-pressure (i.e., supersaturation) during decompression without nucleating gas bubbles. This is referred to as a tissue ratio and is given by the expression Tissue ratio = Safe maximum tissue pressure/ambient pressure with the pressures given on an absolute scale. The rate of descent, therefore, is a matter of the diver's choice while the rate of ascent is limited by a combination of the tissue ratio and the rate at which the dissolved gases enter the bloodstream in the dissolved state and are removed from the body through the lungs.

Boycott, Damant and Haldane ["The Prevention of Compressed-Air Illness," J. Hygiene, 8, 342–443 (1908)] proposed that the body tissues can be considered to be gas diffusion chambers arranged in a parallel circuit with each chamber having a tissue ratio and a half-time characteristic of the equilibration rate of the tissue.

On the basis of their model, Boycott, et al. proposed a radical departure from the conventional continuous decompression schedules which became known as "stage" decompression. Today, their model forms the basis for the modern decompression schedules as set forth in the Standard Navy Decompression Tables. These Tables have been computed using tissue half-times of 20, 40, 80 and 120 minutes and tissue ratios from 2.5/1 to 1.8/1. These Tables are designed for fixed mission dives, that is, dives to a predetermined depth for a predetermined time. Consequently, they are not suitable for the majority of commercial and sport dives since they prescribe a longer-than-necessary decompression schedule as the alternative to hazarding an estimate compensating for depth excursions during a dive. Recognizing the need for a better answer to the problem, the prior art provided decompression meters having input, computation and read-out components of various kinds. In these devices, however, computation is accomplished by the resistive flow of a gas through an orifice or a porous medium which follows the mathematics of Poiseuille flow and not diffusion through a membrane. These devices, then, share the characteristic of inability to compute minimum-duration safe decompression schedules according to the Boycott, et al. model. Thus, because of Poiseuille flow, tissue gas uptake and release actions are not computed according to the expressions used in developing the accepted decompression tables. The use of a diffusion membrane provides the precise analogue to these expressions.

SUMMARY OF THE INVENTION

The key concept underlying this invention and the novel devices hereof is the use of a permselective membrane through which gas diffuses in the dissolved state to simulate the gas-diffusion characteristics of body tissues as they take up and release gas of the breathing mixture as the ambient pressure varies. The present instruments consequently do not depend upon and are not subject to Poiseuille-flow distortions. Instead, they closely match the behavior of body tissues in contact with gas at hyperbaric ambient pressure. This concept further comprehends the use of one or another kind of permselective membrane, depending upon the nature of the breathing gas mixture to be employed. Also, the relative thickness of the membrane area and the volume of the time-constant chamber with which the membrane is operatively associated can be independently varied to match the half-time of the tissue to be monitored, allowance thus being made for variations in permeability of membranes with respect to gas species of the breathing mixture.

Instruments embodying this invention may be designed for use in operative communication with the breathing-mixture supply at ambient pressure. Alternatively, in accordance with an additional novel concept, these devices can be constructed in self-contained form and used separately and independently from the diver's breathing gas supply system without reliability loss or other detriment. In both forms there are ambient-pressure sensing means including an ambient-pressure gas chamber, indicator means including a pressure gauge having a gas chamber for indicating an appropriate decompression schedule, and computing means which includes a gas-diffusion membrane separating the pressure-gauge gas chamber (i.e., the time-constant gas chamber) from the ambient-pressure gas chamber for cumulatively measuring continuously the uptake and release of gas by the simulated human tissue under fluctuating hyperbaric ambient pressure.

The self-contained decompression meter of this invention additionally includes a pressure-responsive means which water-tightly closes the ambient-pressure chamber and is relatively movable in response to ambient water pressure fluctuations so as to automatically maintain the ambient-pressure gas chamber at the pressure to which the diver is being subjected by the water.

DESCRIPTION OF THE DRAWINGS

The novel features of this invention are illustrated in the drawings accompanying and forming a part of this specification, in which:

FIG. 1 is a fragmentary perspective view of a decompression instrument embodying this invention in a preferred form;

FIG. 2 is a vertical, sectional view of the instrument of FIG. 1; and

FIG. 3 is a view like that of FIG. 2 of another instrument of this invention designed for connection to a diver's breathing-mixture supply system.

DETAILED DESCRIPTION OF THE INVENTION

Self-contained instrument 10 of FIG. 1 comprises an immersible three-part housing 11 of transparent, rigid, shape-maintaining plastic material, suitably Lexan polycarbonate resin. Upper or cover portion 12 is cup-shaped and has an annular flange 13. A second cup-shaped shell 14 having an outwardly-extending annular flange 15 and an axial aperture 16 is nested in cover 12 so that flange 13 rests on flange 15 and gauge compartment 17 is provided in the upper part of housing 11. Cover plate 18 is the housing base and has an axial aperture 19 serving as a water-pressure port. The housing members are secured liquid-tightly together by bolts 20 through flanges 13 and 15 and the peripheral portion of plate 18, a natural rubber diaphragm 21 being fastened in place between shell 14 and plate 18 and closing shell 14 to provide ambient-pressure gas chamber 22 therein.

Diaphragm 21 prevents entry of water into chamber 22 from water pressure port 19, but is resiliently responsive to changes in water pressure in the port, deforming in chamber 22 and thereby changing its volume and correspondingly changing the pressure of gas sealed therein.

A bourdon tube instrument assembly 23 including a base 24 in the form of a shallow flanged cup is secured in gauge compartment 17 over aperture 16 so that instrument dial 25 is visible through the top of cover 12. Bourdon tube 26 is connected to indicator 27 for movement in response to changes in pressure within time-constant gas chamber 28 of the instrument assembly.

A gas-diffusion membrane 30 in the form of a 3-mil thick silicone rubber disc is disposed between shell 14 and base 24 so that aperture 16 is closed against effusive gas flow between ambient pressure gas chamber 22 and time-constant or bourdon tube gas chamber 28. Membrane 30 is supported against gas pressure differentials between chambers 22 and 28 by two 60-mil thick discs 31 and 32 of fritted glass, the three-piece membrane assembly being secured in position by bolts 33 around the periphery of the flange of base 24 such that gas may diffuse between chamber 22 and chamber 28 but not between these chambers and gauge compartment 17.

The volume of chamber 22 is suitably of the order of ten-fold greater than that of chamber 28 when the instrument is at atmospheric pressure as depicted in FIGS. 1 and 2.

The instrument of FIG. 3 is similar to that of FIGS. 1 and 2 except that the ambient-pressure chamber is provided with conduit means by which it is connectable to the diver's ambient-pressure breathing supply. This, therefore, is not a self-contained (i.e., self-sufficient) instrument but couples into the diver's breathing equipment and operates in response to changes in the pressure of the breathing gas mixture as regulated by an equalizing valve (not shown).

The FIG. 3 instrument has a housing 40 which includes a cup-shaped, flanged cover 41 of transparent, rigid, shape-maintaining plastic material suitable for immersion to diving depths. Additionally, housing 40 includes a second cup-shaped shell 42 having an outwardly-extending flange 43 and diametrically-opposed breathing gas inlet and outlet ports 44 and 45 in its side walls and axial aperture 50 in its top wall. In cooperation with cover 41, shell 42 defines gauge compartment 48. A cover disc 46 of the same plastic material closes the open lower end of shell 42, being secured thereto around the periphery of flange 43 by bolts 47, and in cooperation with shell 42 provides ambient-pressure gas chamber 49.

Bourdon tube instrument assembly 51 in gauge compartment 48 includes bourdon tube 52 mounted on base 53 secured to shell 42 by bolts 54. A dial 55 is situated above the bourdon tube 52; an indicator 56 above the dial is operatively connected to the bourdon tube. Base 53 and bourdon tube 52 together provide a volume V which serves as a time-constant chamber.

Membrane 57 of silicone rubber in the form of a 3-mil thick sheet is disposed over aperture 50, closing volume V, and is held in place with its peripheral portion under the flange of base 53. Support of membrane 57 against gas pressure differentials between chambers 49 and V is provided in the form of two fritted-glass filters 58 and 59 of thickness about 60 mils between which the membrane is sandwiched.

In assembling instrument 10, rubber diaphragm 21 is mounted in place with chamber 22 containing air at normal atmospheric pressure and temperature. Likewise, membrane 30 and bourdon tube instrument assembly 23 are mounted in place with gauge chamber 28 containing air at normal atmospheric pressure and temperature. Gauge compartment 17 also suitably containing air at normal atmospheric temperature and pressure is hermetically sealed. Similarly, the FIG. 3 embodiment of the invention is assembled under atmospheric conditions, although in the case of chamber 49, the initial gas state is not of special concern since this is not a sealed static volume.

The permselective membranes employed in the devices of this invention are selected with regard to the composition of the breathing gas mixture. In the case of atmospheric air, a silicone rubber membrane of minimum thickness of 3 to 4 mils is preferred. In the case of a heliox mixture, tetrafluoroethylene polymer (suitably Teflon plastic) affords the special advantage of selectively passing helium gas. Its $He/O_2$ selectivity ratio is 20:1 whereas silicone rubber has a $He/O_2$ selectivity ratio of only 0.6/1.0. If the breathing mixture is not air and an instrument of the FIG. 1 type is to be used, it may be desirable or necessary that gauge chamber 28 and ambient-pressure chamber 22 be both charged initially with the breathing mixture composition. In any event, however, the initial gas pressure in both these chambers for convenience should be substantially atmospheric pressure.

Membrane nitrogen permeabilities and activation energies for several commercially-available membrane materials useful in devices of this invention are set forth in Table I.

TABLE I

| Material | Permeability ($cm^2 sec^{-1} atm^{-1}$ at 20°C) | Activation Energy k cal/mole |
|---|---|---|
| Polypropylene | $6.5 \times 10^{-10}$ | |
| Polyethylene | $1.9 \times 10^{-9}$ | 10.82 |
| Polyvinylchloride | $3.2 \times 10^{-9}$ | |
| Teflon Plastic | $1.0 \times 10^{-8}$ | 5.98 |
| Natural Rubber | $2.8 \times 10^{-8}$ | 8.72 |
| Silicone Rubber | $2.6 \times 10^{-6}$ | < 4.00 |

The considerable variation in the nitrogen permeabilities and activation energies of these and other materials which may be used to provide the key membrane element of the novel instruments of this invention requires consideration in selection to simulate body tissue gas uptake and release characteristics. Silicone rubber is generally preferred because it is more permeable and because it possesses similar permeability for oxygen and nitrogen which permits the use of air as the permeating gas. Also, it has the advantages that the activation energy for nitrogen or oxygen permeation through silicone rubber is less than 4 k cal per mole, which will result in only minor changes in the chamber half-time constant within the anticipated service temperature range, and that it is sufficiently compressible to serve as its own gasket. Silicone rubber membranes, however, do not have sufficient strength to support the required gas pressure differentials and are, therefore, backed with a material which provides necessary mechanical support without damage to the membrane, significant reduction of the effective membrane area or alteration of the gas permeation mechanism. In addition to the fritted glass filters described above, porous ceramic filters, filter papers backed with thin metal grids, and even cigarette filters may be used.

The bourdon gauge of these illustrated instruments has a 1.5 inch diameter dial face and a 60 psi rating so that it allows decompression stops as deep as 50 feet to be indicated, and yet the size of the instruments is compatible with a wrist-worn device. The bourdon tube gauge chamber volume is approximately 0.15 cubic inch. Also, as indicated in the drawings which although diagrammatic are in rough approximation to scale, apertures 16 and 50 are of diameter about ¼ inch and the diameter of chambers 28 and V is about ⅝ inch. These instruments consequently have an 80-minute half-time rating.

MODE OF OPERATION

When the instrument of FIGS. 1 and 2 is carried through a diving excursion, the volume of ambient pressure gas chamber 22 fluctuates with changes in water pressure in port 19, diaphragm 21 being deformed by the pressure differential across it. An increase in gas pressure in chamber 22 results in a gas pressure differential across membrane 30, which leads to diffusion of gas from chamber 22 into gauge chamber 28 and consequent proportional deflection of bourdon tube 26. Indicator 27 is actuated by the bourdon tube deflection and the meter dial calibrated in feet of depth then indicates continuously the extent of body tissue gas uptake in terms of the required decompression stop depths. During decompression, the device programs, via pressure decay in time-constant chamber 28, a safe decompression schedule of minimum duration for tissues having a time-constant characteristic matched by diffusion membranes 30 and 57 and their associated time-constant chambers. In other words, the gas-diffusion effect is reversible and repetitious so that for a selected time-constant tissue full account is taken automatically of all the different times-at-depth experienced on a random depth-course dive. In addition, the residual pressure in the time-constant chamber when the diver reaches the surface provides the device with a memory for decompression calculations during a repetitive dive. These important functions and features are multiplied in accordance with the invention disclosed and claimed in copending application Ser. No. 181,107 (Docket RD-4064) referred to above to provide a versatile instrument in which a number of different time-constant tissues are separately matched by different time-constant diffusion-membrane chambers. That instrument consequently can automatically compute minimum-duration safe decompression schedules for dives of widely varying times and depths in which different decompression-rate limitations are imposed by dissimilar time-constant tissues.

The FIG. 3 instrument functions in much the same general manner as that of FIGS. 1 and 2, differing principally in that pressure in ambient pressure gas chamber 49 is the pressure provided by the breathing gas mixture as it is supplied to the diver. However, the pressure of this flowing gas is regulated by an equalizer valve in the otherwise conventional breathing gas supply system and causes gas diffusion through membrane 57 in simulation of the uptake and release of gas by body tissues during the dive. Again, therefore, all the variations of time and depth are logged by the instrument and computed and indicated in terms of the shortest safe schedule of decompression time and depth for the diver's return to the surface.

The mathematical expression used in the computation of the U. S. Navy diving tables is $$P_A - P/P_A - P_0 = e^{-t/\tau}$$

where
- $P_A$ is the absolute ambient pressure
- $P_0$ is the absolute initial pressure in the tissue
- $P$ is the absolute instantaneous tissue pressure
- $t$ is the time
- $\tau$ is the tissue time constant The time constant, $\tau$, is given by the expression $$= V \cdot X/A \cdot \phi$$

where
- $V$ is the constant chamber volume
- $X$ is the membrane thickness
- $A$ is the membrane area
- $\phi$ is the membrane permeability A plot of $ln\ (P_A - P/P_A - P_0)$ vs. time at any constant ambient pressure should produce a single straight line whose slope is given by $-1/\tau$. The data for our device utilizing membranes yields the exact analogue of this expression and produces the specified linear plot.

What I claim as new and desire to secure by Letters Patent of the United States is:

1. A pneumatic analogue decompression instrument to sense continuously ambient pressures experienced during hyperbaric exposure and to compute and indicate the minimum-duration safe decompression schedule which comprises,
   a. an ambient pressure-sensing means including an ambient pressure gas chamber;
   b. indicator means including a pressure gauge having a gas chamber for indicating the appropriate decompression schedule in terms of hyperbaric pressures and time intervals; and
   c. a computing means consisting of an imperforate gas-diffusion membrane which separates the pressure gauge gas chamber from the ambient-pressure gas chamber and cumulatively and continuously measures the uptake and release of gas by human tissues under fluctuating hyperbaric ambient pressures.

2. The instrument of claim 1 in which the gas-diffusion membrane is of silicone rubber.

3. The instrument of claim 1 in which the gas-diffusion membrane is of polytetrafluoroethylene.

4. The instrument described in claim 1 in which the pressure gauge is a bourdon tube gauge.

5. The claim 1 instrument in which the ambient pressure-sensing means includes a water-tight resilient diaphragm of rubber-like material constituting a wall portion of the ambient gas-pressure chamber.

6. A self-contained decompression meter for use by a scuba diver comprising,
   a. a submersible housing having a transparent portion and a water-pressure port;
   b. an ambient-pressure gas chamber in the housing;
   c. pressure-responsive means water-tightly closing the ambient-pressure gas chamber and movable relative to the housing in response to fluctuations of water pressure in the said port;
   d. imperforate gas-diffusion membrane means in the housing operatively associated with the ambient-pressure gas chamber to measure continuously the uptake and release of gas by a diver's tissues during an underwater excursion; and,
   e. indicator means in the housing including a gauge having a face visible through the transparent portion of the housing and operatively associated with the gas-diffusion membrane means.

7. The decompression meter of claim 6 in which the housing has an internal wall dividing the volume into two compartments communicating through a central opening in the internal wall, and in which the ambient-pressure gas chamber is defined by the internal wall and the housing and by the pressure-responsive means in the form of a resilient diaphragm of rubber-like material water-tightly sealed to the inner surface of the housing.

8. The claim 1 instrument in which the ambient pressure sensing means includes a port for communication of the ambient pressure gas chamber with an ambient pressure gas source.

* * * * *